US011218685B2

(12) United States Patent
Hannuksela

(10) Patent No.: US 11,218,685 B2
(45) Date of Patent: Jan. 4, 2022

(54) METHOD, AN APPARATUS AND A COMPUTER PROGRAM PRODUCT FOR VIRTUAL REALITY

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/981,785

(22) PCT Filed: Mar. 21, 2019

(86) PCT No.: PCT/FI2019/050237
§ 371 (c)(1),
(2) Date: Sep. 17, 2020

(87) PCT Pub. No.: WO2019/185986
PCT Pub. Date: Oct. 3, 2019

(65) Prior Publication Data
US 2021/0112233 A1    Apr. 15, 2021

(30) Foreign Application Priority Data

Mar. 28, 2018    (FI) ...................................... 20185288

(51) Int. Cl.
*H04N 13/178*    (2018.01)
*H04N 13/128*    (2018.01)
(Continued)

(52) U.S. Cl.
CPC ......... *H04N 13/178* (2018.05); *G06T 3/0087* (2013.01); *H04N 13/111* (2018.05);
(Continued)

(58) Field of Classification Search
None
See application file for complete search history.

(56) References Cited

U.S. PATENT DOCUMENTS 10,848,737 B2 * 11/2020 Hur ...................... H04N 13/178
2010/0136507 A1    6/2010 Miyata et al.
(Continued)

FOREIGN PATENT DOCUMENTS

| WO | 2013/049248 A1 | 4/2013 |
| WO | 2015/123775 A1 | 8/2015 |
| WO | 2017/153775 A1 | 9/2017 |

OTHER PUBLICATIONS

"Requirements MPEG-I pahes 1b", ISO/IEC JTC1/SC29/WG11, N 17331, Requirements, Jan. 2018, 8 pages.
(Continued)

*Primary Examiner* — Christopher Braniff
(74) *Attorney, Agent, or Firm* — Harrington & Smith

(57) ABSTRACT

The invention relates to a solution wherein a bitstream defining a presentation is generated, the presentation comprising an omnidirectional visual media content and a visual overlay. A first relative distance of the omnidirectional visual media content and a second relative distance of the visual overlay are indicated in the bitstream. Metadata indicative of a scale applicable to convert the first relative distance and the second relative distance to real-world distance units is also associated with the generated bitstream, wherein the scale is for deriving a binocular disparity for the visual overlay. The invention also concerns a solution for decoding the bitstream to obtain data for deriving binocular disparity for the visual overlay.

20 Claims, 7 Drawing Sheets

(51) Int. Cl.
*H04N 13/161* (2018.01)
*H04N 13/111* (2018.01)
*G06T 3/00* (2006.01)
*H04N 13/00* (2018.01)

(52) U.S. Cl.
CPC ......... *H04N 13/128* (2018.05); *H04N 13/161* (2018.05); *H04N 2013/0081* (2013.01)

(56) References Cited

U.S. PATENT DOCUMENTS

| | | | |
|---|---|---|---|
| 2011/0141233 | A1 | 6/2011 | Tsukagoshi |
| 2012/0099836 | A1 | 4/2012 | Welsh et al. |
| 2013/0088571 | A1 | 4/2013 | Suh et al. |
| 2020/0177862 | A1* | 6/2020 | Routhier .............. H04N 5/2628 |

OTHER PUBLICATIONS

"Information Technology—Coding of Audio-Visual Objects—Part 12: ISO Base Media File Format", ISO/IEC 14496-12, Fifth edition, Dec. 15, 2015, 248 pages.
"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end packet switched streaming service (PSS); 3GPP file format (3GP) (Release 14)", 3GPP TS 26.244, V14.1.0, Dec. 2017, pp. 1-67.
"3rd Generation Partnership Project; Technical Specification Group Services and System Aspects; Transparent end-to-end Packet-switched Streaming Service (PSS); Protocols and codecs (Release 15)", 3GPP TS 26.234, V15.0.0, Dec. 2017, pp. 1-173.
"Information Technology—Dynamic Adaptive Streaming over HTTP (DASH), Part 1: Media Presentation Description and Segment Formats", ISO/IEC 23009-1, May 15, 2014, 152 pages.
Pantos et al., "HTTP Live Streaming", RFC 8216, Independent Submission, Aug. 2017, pp. 1-60.
Office action received for corresponding Finnish Patent Application No. 20185288, dated Nov. 28, 2018, 8 pages.
"Information technology—Coded Representation of Immersive Media (MPEG-1)—Part 2: Omnidirectional Media Format", ISO/IEC FDIS 23090-2:201x (E), ISO/IEC JTC 1/SC 29/WG 11, Feb. 7, 2018, 181 pages.
Zhu, "Omnidirectional Stereo Vision", Workshop on Omnidirectional Vision, in the 10th IEEE ICAR, 2001, 12 pages.
International Search Report and Written Opinion received for corresponding Patent Cooperation Treaty Application No. PCT/FI2019/050237, dated Sep. 26, 2019, 18 pages.

* cited by examiner

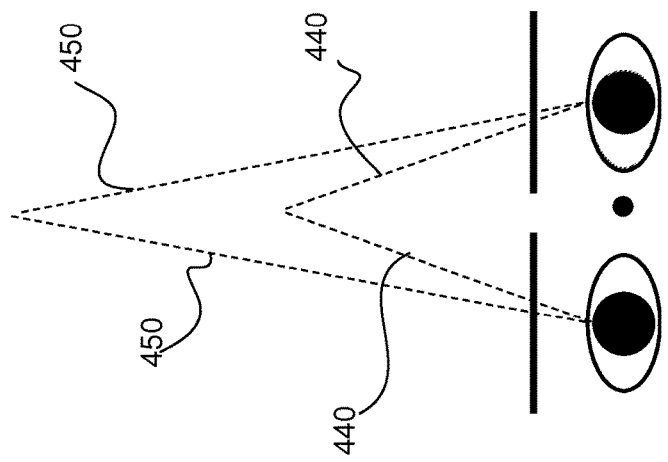
Figure 5
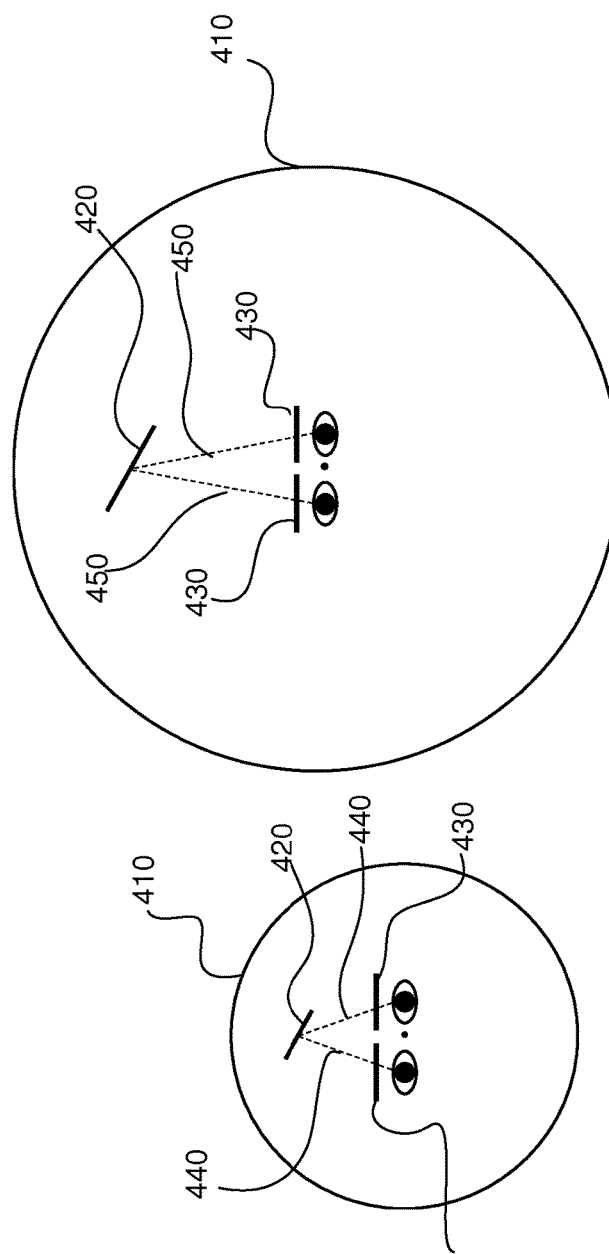
Figure 4b
Figure 4a

METHOD, AN APPARATUS AND A COMPUTER PROGRAM PRODUCT FOR VIRTUAL REALITY

RELATED APPLICATION

This application claims priority to PCT Application No. PCT/FI2019/050237, filed on Mar. 21, 2019, which claims priority to FI Application No. 20185288, filed on Mar. 28, 2018, each of which is incorporated herein by reference in its entirety.

TECHNICAL FIELD

The present solution generally relates to virtual reality. In particular, the solution relates to a solution for indicating binocular disparity for monoscopic visual overlays.

BACKGROUND

Since the beginning of photography and cinematography, the most common type of image and video content has been captured by cameras with relatively narrow field of view, and displayed as a rectangular scene on flat displays. Such content is referred as "flat content", or "flat image", or "flat video" in this application. The cameras are mainly directional, whereby they capture only a limited angular field of view (the field of view towards which they are directed).

More recently, new image and video capture devices are available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

Now there has been invented an improved method and technical equipment implementing the method, for defining a binocular disparity of a monoscopic overlay for stereoscopic viewing. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method comprising generating a bitstream defining a presentation, the presentation comprising an omnidirectional visual media content and a visual overlay; indicating in the bitstream a first relative distance of the omnidirectional visual media content; indicating in the bitstream a second relative distance of the visual overlay; and associating with the generated bitstream metadata indicative of a scale applicable to convert the first relative distance and the second relative distance to real-world distance units, wherein the scale is for deriving a binocular disparity for the visual overlay.

According to a second aspect, there is provided an apparatus comprising means for generating a bitstream defining a presentation, the presentation comprising an omnidirectional visual media content and a visual overlay; means for indicating in the bitstream a first relative distance of the omnidirectional visual media content; means for indicating in the bitstream a second relative distance of the visual overlay; and means for associating with the generated bitstream metadata indicative of a scale applicable to convert the first relative distance and the second relative distance to real-world distance units, wherein the scale is for deriving a binocular disparity for the visual overlay.

According to a third aspect, there is provided a computer program product embodied on a non-transitory computer readable medium, comprising computer program code configured to, when executed on at least one processor, cause an apparatus or a system to generate a bitstream defining a presentation, the presentation comprising an omnidirectional visual media content and a visual overlay; indicate in the bitstream a first relative distance of the omnidirectional visual media content; indicate in the bitstream a second relative distance of the visual overlay; and associate with the generated bitstream metadata indicative of a scale applicable to convert the first relative distance and the second relative distance to real-world distance units, wherein the scale is for deriving a binocular disparity for the visual overlay.

According to an embodiment, the bitstream is a container file comprising an encapsulated presentation.

According to an embodiment, the bitstream is a media description describing the presentation.

According to an embodiment, the omnidirectional visual media content is omnidirectional video or omnidirectional image.

According to an embodiment, the visual overlay is one of the following: a monoscopic video, a monoscopic image, graphics, text.

According to an embodiment, the first relative distance is 1 or the first relative distance comprises multiple values indicated through a depth map.

According to an embodiment, the second relative distance is one of the following: a norm of a normal vector of a plane on which the visual overlay is rendered; a vector intersecting an origin of a coordinate system and a reference point of a plane on which the visual overlay is rendered; multiple values indicated through a depth map.

According to an embodiment, the apparatus further comprises means for indicating a third relative distance of cube faces for monoscopic omnidirectional visual media content of a cube map projection format, the third relative distance being applicable for directly using the cube map as a rendering mesh, or indicating that the first relative distance is applicable for directly using the cube map as a rendering mesh.

According to a fourth aspect, there is provided a method comprising determining from a bitstream a presentation, the presentation comprising an omnidirectional visual media content and a visual overlay; determining from the bitstream a first relative distance of the omnidirectional visual media content; decoding from the bitstream a second relative distance of the visual overlay; decoding from the bitstream metadata indicative of a scale applicable to convert the first relative distance and the second relative distance to real-world distance units; and using the scale to derive binocular disparity for the visual overlay.

According to a fifth aspect, there is provided an apparatus comprising means for determining from a bitstream a presentation, the presentation comprising an omnidirectional visual media content and a visual overlay; means for determining from the bitstream a first relative distance of the omnidirectional visual media content; means for decoding from the bitstream a second relative distance of the visual overlay; means for decoding from the bitstream metadata indicative of a scale applicable to convert the first relative distance and the second relative distance to real-world distance units; and means for using the scale to derive binocular disparity for the visual overlay.

According to a sixth aspect, there is provided a computer program product embodied on a non-transitory computer readable medium, comprising computer program code configured to, when executed on at least one processor, cause an apparatus or a system to: determine from a bitstream a presentation, the presentation comprising an omnidirectional visual media content and a visual overlay; determine from the bitstream a first relative distance of the omnidirectional visual media content; decode from the bitstream a second relative distance of the visual overlay; decode from the bitstream metadata indicative of a scale applicable to convert the first relative distance and the second relative distance to real-world distance units; and use the scale to derive binocular disparity for the visual overlay.

According to embodiment, a third relative distance of cube faces is decoded for monoscopic omnidirectional visual media content of a cube map projection format, the third relative distance being applicable for directly using the cube map as a rendering mesh, or decoding that the first relative distance is applicable for directly using the cube map as a rendering mesh; and the cube map is used as a rendering mesh in rendering.

DESCRIPTION OF THE DRAWINGS

In the following, various embodiments of the invention will be described in more detail with reference to the appended drawings, in which

FIGS. 4a, 4b show a two-dimensional illustration of rendering of omnidirectional image/video and a visual overlay on a stereoscopic display;

FIG. 5 shows an example of a binocular disparity of the rendering of the visual overlay;

DESCRIPTION OF EXAMPLE EMBODIMENTS

Figure 1:
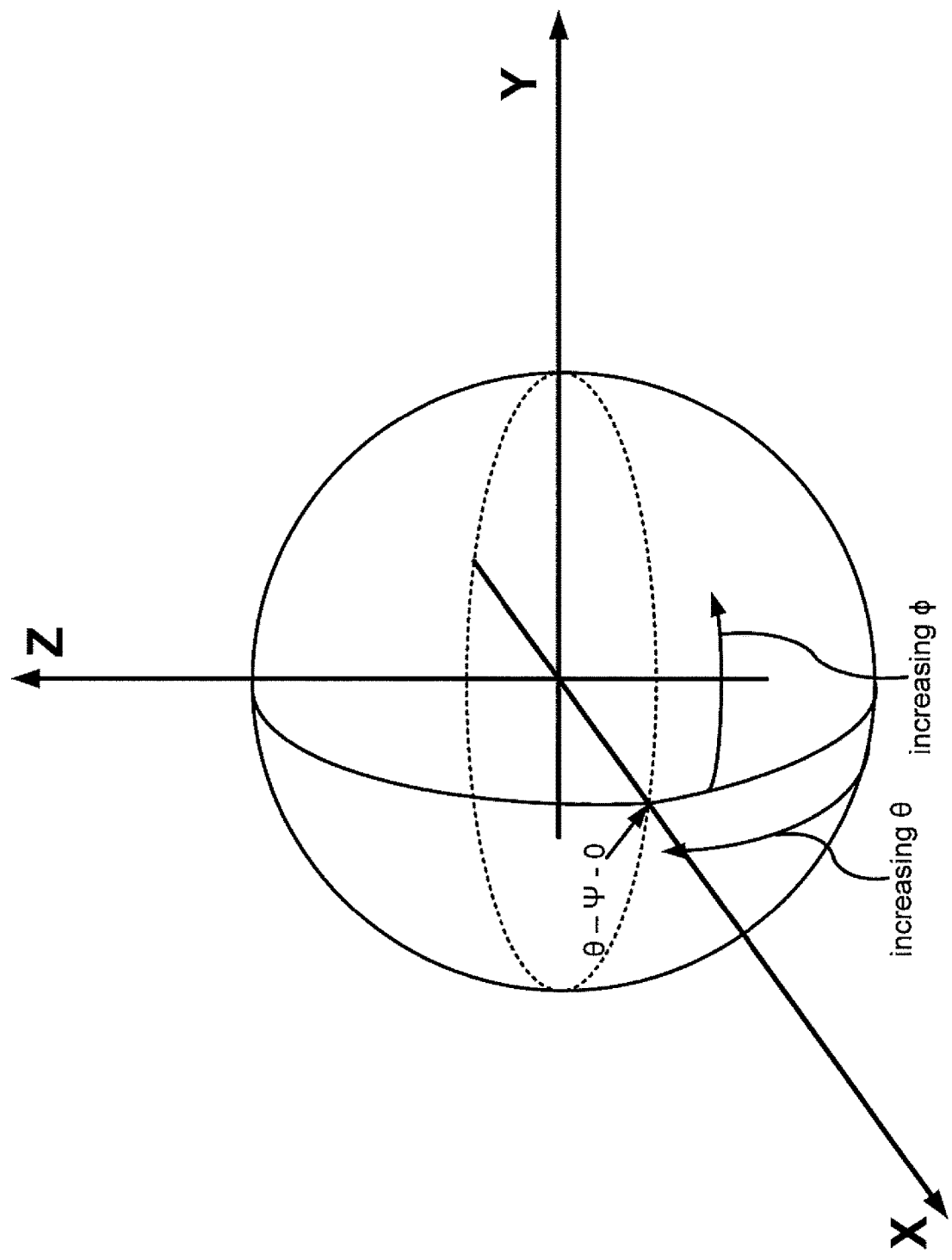
FIG. 1 shows an example of the relation of the sphere coordinates to azimuth and elevation to the X, Y, and Z coordinate axes.

In the following, several embodiments of the invention will be described in the context of virtual reality.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISOBMFF is the base for derivation of all the above mentioned file formats (excluding the ISOBMFF itself).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes. Each box is identified by a four character code (4CC) and starts with a header which informs about the type and size of the box.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derive from generic classes (e.g. VisualSampleEntry, AudioSampleEntry). Which type of sample entry form is used for derivation the track-type specific sample entry format is determined by the media handler of the track.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

A media segment may comprise one or more self-contained movie fragments. A media segment may be used for delivery, such as streaming, e.g. in MPEG-DASH.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping. A default sample group entry may be given in a SampleGroupDescriptionBox, applying to all samples that are not mapped in any SampleToGroupBox of the same sample grouping.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using XML syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

An entity may be defined as a collective term of a track or an item. An entity group is a grouping of items, which may also group tracks. An entity group can be used instead of item references, when the grouped entities do not have clear dependency or directional reference relation. The entities in an entity group share a particular characteristic or have a particular relationship, as indicated by the grouping type.

An entity group is a grouping of items, which may also group tracks. The entities in an entity group share a particular characteristic or have a particular relationship, as indicated by the grouping type.

Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track.

GroupsListBox contains EntityToGroupBoxes, each specifying one entity group. The syntax of EntityToGroupBox is specified as follows:

```
aligned(8) class EntityToGroupBox(grouping_type, version,
flags)
extends FullBox(grouping_type, version, flags) {
unsigned int(32) group_id;
unsigned int (32) num_entities_in_group;
for (i=0; i<num_entities_in_group; i++)
    unsigned int(32) entity_id;
// the remaining data may be specified for a particular
grouping_type
}
``` entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

TrackGroupBox, which is contained in Trackbox, enables indication of groups of tracks, where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. The syntax of the contained boxes is defined through TrackGroupTypeBox is follows:

```
aligned(8) class TrackGroupTypeBox(unsigned int(32)
track_group_type) extends FullBox(track_group_type, version =
0, flags = 0)
{
unsigned int(32) track_group_id;
// the remaining data may be specified for a particular
track_group_type
}
```

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). MPEG DASH and 3GP-DASH are technically close to each other and may therefore be collectively referred to as DASH.

Some concepts, structures, and specifications of DASH are described below as an example of a container file format, based on which the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. Attributes in an XML document may be identified by a lower-case first letter as well as they may be preceded by a '@'-sign, e.g. @attribute. To point to a specific attribute @attribute contained in an element Element, one may write Element@attribute.

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

Streaming systems similar to MPEG-DASH include for example HTTP Live Streaming (a.k.a. HLS), specified in the IETF RFC 8216. As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName=AttributeValue. Hence, tags of HLS M3U8 files may be considered similar to Elements in MPD or XML, and attributes of HLS M3U8 files may be considered similar to Attributes in MPD or XML. Media segments in some versions of HLS are formatted according to the MPEG-2 Transport Stream and contain a single MPEG-2 Program. Each media segment is recommended to start with a Program Association Table (PAT) and a Program Map Table (PMT).

Omnidirectional Media Format (OMAF), formally referred to as ISO/IEC 23090-2, is a standard developed by the Moving Picture Experts Group (MPEG), formally referred to as ISO/IEC JTC1/SC29/WG11. The first version of OMAF, hereafter referred to as OMAF v1, was technically finalized late 2017. At the time of writing this disclosure, the work towards an amendment of OMAF v1 has been initiated. Some key definitions and concepts of OMAF are described in this section as an example, wherein the embodiments may be implemented. The aspects of the invention are not limited to OMAF or its extensions, but rather the description is given for one possible basis on top of which the invention may be partly or fully realized.

OMAF defines a media format by extending ISOBMFF, HEIF, and DASH for enabling omnidirectional media applications that focus on 360-degree content (e.g. video, images, audio, text). OMAF specifies a coordinate system that consists of a unit sphere and three coordinate axes, i.e. the X (back-to-front) axis, the Y (lateral, side-to-side) axis, and the Z (vertical, up) axis, where the three axes cross at the centre of the sphere.

The location of a point on the unit sphere is identified by a pair of sphere coordinates azimuth ($\phi$) and elevation ($\theta$). FIG. 1 illustrates the relation of the sphere coordinates azimuth ($\phi$) and elevation ($\theta$) to the X, Y, and Z coordinate axes. The value ranges of azimuth is −180.0, inclusive, to 180.0, exclusive, degrees. The value range of elevation is −90.0 to 90.0, inclusive, degrees.

Global coordinate axes may be defined as coordinate axes, e.g. according to the coordinate system as discussed above, that are associated with audio, video, and images representing the same acquisition position and intended to be rendered together. The origin of the global coordinate axes is usually the same as the center point of a device or rig used for omnidirectional audio/video acquisition as well as the position of the observer's head in the three-dimensional space in which the audio and video tracks are located.

360-degree panoramic or omnidirectional three-degrees-of-freedom (3 DoF) content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic content may have less than 360-degree horizontal field-of-view and up to 180-degree vertical field-of-view, while otherwise have the characteristics of equirectangular projection format.

In cube map projection format, spherical video is projected onto the six faces (a.k.a. sides) of a cube. The cube map may be generated e.g. by first rendering the spherical scene six times from a viewpoint, with the views defined by an 90 degree view frustum representing each cube face. The cube sides may be frame-packed into the same frame or each cube side may be treated individually (e.g. in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

The equirectangular projection may defined as a process that converts any sample location within the projected picture (of the equirectangular projection format) to angular coordinates of a coordinate system. The sample location within the projected picture may be defined relative to pictureWidth and pictureHeight, which are the width and height, respectively, of the equirectangular panorama picture in samples. In the following, let the center point of a sample location along horizontal and vertical axes be denoted as i and j, respectively. The angular coordinates ($\phi$, $\theta$) for the sample location, in degrees, are given by the following equirectangular mapping equations: $\phi=(0.5-i\div pictureWidth)*360$, $\theta=(0.5-j\div pictureHeight)*180$.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

The projection structure (such as a sphere) may be rotated relative to the global coordinate axes. The rotation may be performed for example to achieve better compression performance based on the spatial and temporal activity of the content at certain spherical parts. Alternatively or additionally, the rotation may be performed to adjust the rendering orientation for already encoded content. For example, if the horizon of the encoded content is not horizontal, it may be adjusted afterwards by indicating that the projection structure is rotated relative to the global coordinate axes. The projection orientation may be indicated as yaw, pitch, and roll angles that define the orientation of the projection structure or local coordinate axes relative to the global coordinate axes. The projection orientation may be included e.g. in a box in a sample entry of an ISOBMFF track for omnidirectional video.

Region-wise packing information may be encoded as metadata in or along the bitstream. For example, the packing information may comprise a region-wise mapping from a pre-defined or indicated source format to the packed frame format, e.g. from a projected picture to a packed picture, as described earlier.

Rectangular region-wise packing metadata is described next: For each region, the metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

Figure 2:
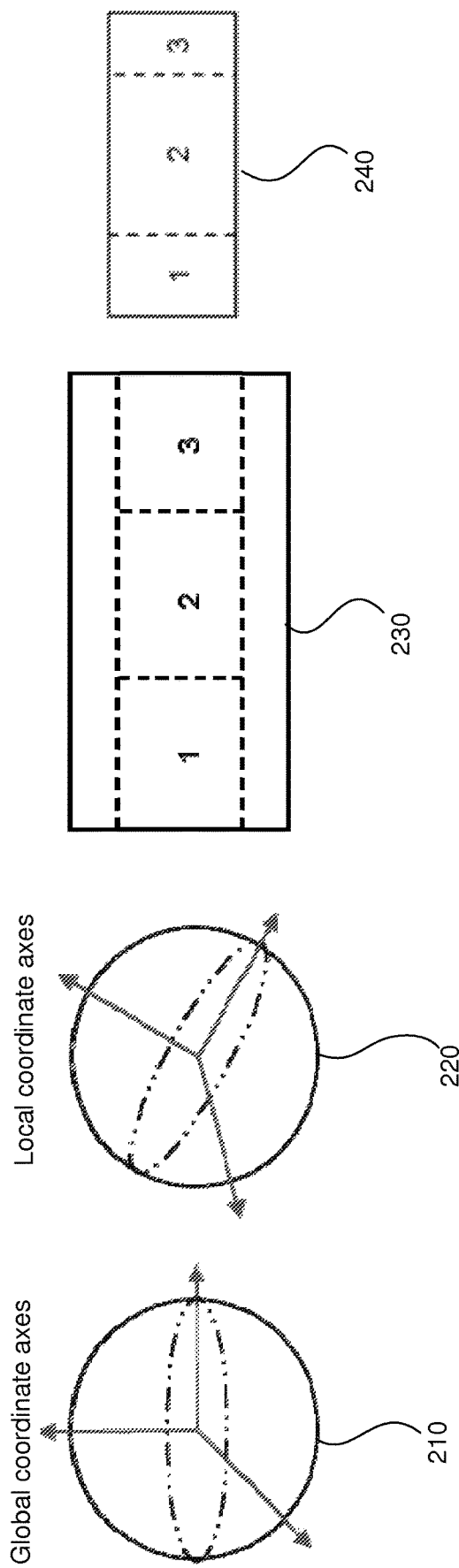
FIG. 2 shows an example of a conversion of a spherical picture to a packed picture.

FIG. 2 illustrates conversions from a spherical picture 210 to a packed picture 240 that can be used in content authoring, and the corresponding conversion from a packed picture to a spherical picture to be rendered that can be used in an OMAF player. The example shown in FIG. 2 is described for a packed picture that appears in a projected omnidirectional video track. Similar description can be derived for an image item. FIG. 2 shows a unit sphere 210 aligned with global coordinate axes and a unit sphere 220 aligned with local coordinate axes. In addition, FIG. 2 shows a projected picture 230 on which regions for region-wise packing are specified.

Content authoring can comprise the following steps:
The source images provided as input are stitched to generate a sphere picture on the unit sphere per the global coordinate axes as indicated by 210.

The unit sphere is then rotated relative to the global coordinate axes, as indicated by 220. The amount of rotation to convert from the local coordinate axes to the global coordinate axes is specified by the rotation angles indicated in the RotationBox. The local coordinate axes of the unit sphere are the axes of the coordinate system that has been rotated. The absence of RotationBox indicates that the local coordinate axes are the same as the global coordinate axes.

As illustrated in FIG. 2, the spherical picture on the rotated unit sphere is then converted to a two-dimensional projected picture 230, for example using the equirectangular projection. When spatial packing of stereoscopic content is applied, two spherical picture for the two views are converted to two constituent pictures, after which frame packing is applied to pack the two constituent pictures on one projected picture.

Rectangular region-wise packing can be applied to obtain a packed picture from the projected picture. FIG. 2 illustrates one example of packing where packed picture 240 is obtained from the projected picture 230. The dashed rectangles in projected picture 230 indicates the projected regions, and the respective areas in the packed picture 240 indicate the corresponding packed regions. In this example, the projected regions 1 and 3 are horizontally downsampled, while projected region 2 is kept at its original resolution.

Figure 3:
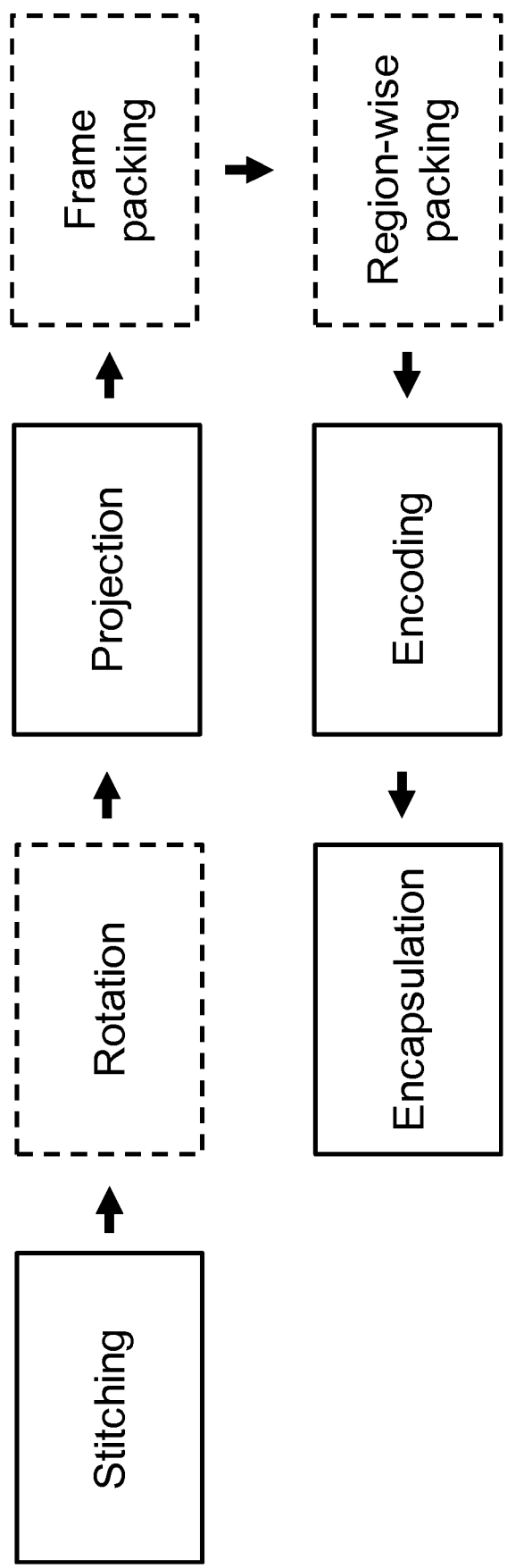
FIG. 3 shows an example of OMAF video processing steps.

An example of a OMAF video processing steps is illustrated in FIG. 3.

In order to map sample locations of a packed picture, e.g. a packed picture 240 shown in FIG. 2, to a unit sphere used in rendering illustrated by a unit sphere 210 in FIG. 2, the OMAF player can perform the following steps:

A packed picture, e.g. picture 240, is obtained as a result of decoding a picture from a video track or an image item.

If needed, chroma sample arrays of the packed picture are upsampled to the resolution of the luma sample array of the packed picture, and colour space conversion can also be performed.

If region-wise packing is indicated, the sample locations of the packed picture are converted to sample locations of the respective projected picture, such as picture 230. Otherwise, the projected picture is identical to the packed picture.

If spatial frame packing of the projected picture is indicated, the sample locations of the projected picture are converted to sample locations of the respective constituent picture of the projected picture. Otherwise, the constituent picture of the projected picture is identical to the projected picture.

The sample locations of a constituent picture are converted to sphere coordinates that are relative to local coordinate axes, as specified for the omnidirectional projection format being used. The resulting sample locations correspond to a sphere picture, such as a sphere picture 220 in FIG. 2.

If rotation is indicated, the sphere coordinates relative to the local coordinate axes are converted to sphere coordinates relative to the global coordinate axes. Otherwise, the global coordinate axes are identical to the local coordinate axes.

A packed region may be defined as a region in a packed picture that is mapped to a projected region as specified by the region-wise packing signaling. A projected region may be defined as a region in a projected picture that is mapped to a packed region as specified by the region-wise packing signaling.

A sphere region may be defined as a region on a sphere, which may be further constrained by the means to specify the sphere region, which may include but might not be limited to specifying the region either by four great circles or by two yaw circles and two pitch circles. A great circle may be defined as an intersection of the sphere and a plane that passes through the center point of the sphere. A great circle is also known as an orthodrome or Riemannian circle. The center of the sphere and the center of a great circle are co-located. A pitch circle may be defined as a circle on the sphere connecting all points with the same pitch value. A yaw circle may be defined as a circle on the sphere connecting all points with the same yaw value. A sphere region may further require a point within the region, such as the center point of the region, to make it distinct from another sphere region that would otherwise be defined with the same parameters (e.g., the same great circles).

Binocular disparity may be defined as a difference in image location of an object seen by the left and right eyes or displayed on the left and right views of a display. In the specification visual media can be overlaid by using coordinate system aligned with the OMAF.

When an omnidirectional video/image content is overlaid with video/image content (i.e. "overlays"), the overlay(ing) video/image content may be monoscopic. For monoscopic content, it has been considered to be a player issue to use proper disparity (if any); for stereoscopic content the scale has been inbuilt on the disparity between views.

Therefore, the present embodiments are targeted to a problem, which occurs when the overlay image/video is monoscopic, for defining a binocular disparity (on a sphere domain) of the overlay image/video for stereoscopic viewing.

The problem is illustrated in FIGS. 4a, 4b and 5. FIGS. 4a and 4b show a two-dimensional illustration of rendering of omnidirectional image/video 410 and a visual overlay 420 on a stereoscopic display 430, when the relative distances of the omnidirectional image/video and visual overlay are pre-defined or indicated. Both FIGS. 4a and 4b illustrates a valid player behavior. In other words, when only relative units are provided, the player can choose how they are converted to real-world distances or binocular disparity 440, 450. FIG. 5 shows an illustrates of the resulting binocular disparity 440, 450 differences for the center point of the overlay resulting from the chosen rendering in FIG. 4a, b. It can be seen that the binocular disparity of the visual overlay differs significantly depending on how the player decided to convert the relative distances.

Figure 6:
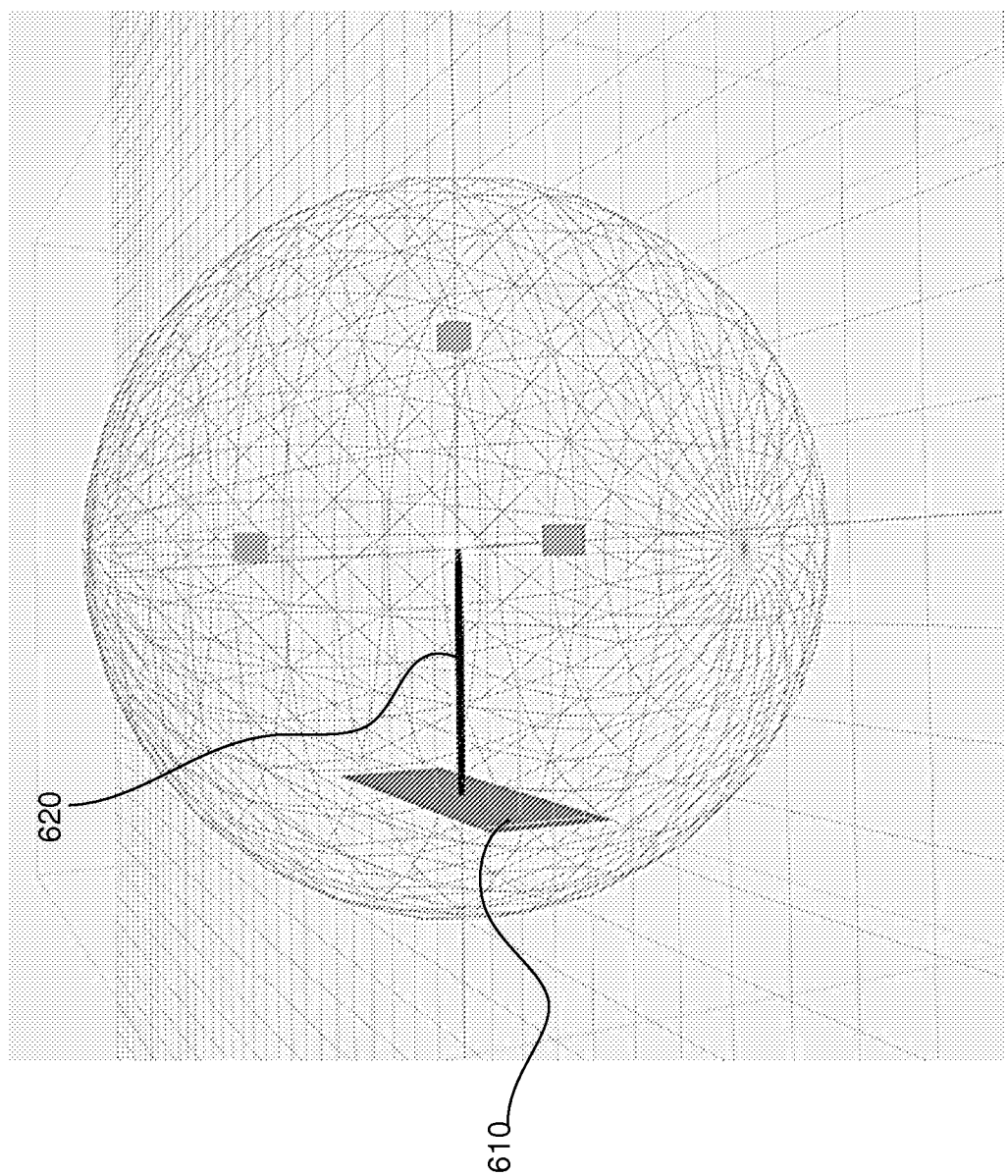
FIG. 6 shows an example of a region on which a timed text is rendered.

OMAF v1 specifies an option to render timed text at a particular depth level relative to the unit sphere. SphereRegionStruct( ) indicates a sphere location that is used, together with other information, to determine where the timed text is placed and displayed in 3D space. The vector between the centre of the sphere, and this sphere location is the norm of the rendering 3D plane on which the timed text cue is to be rendered This information and the depth of the 3D plane are used to determine the position of the rendering 3D plane in 3D space on which the timed text cue is to be rendered. An example of such region is shown in FIG. 6. FIG. 6 shows an example of a region on which the timed text is rendered. The plane 610 indicates the region, and the line 620 indicates the depth.

When SphereRegionStruct( ) is included in the OmafTimedTextConfigBox, the following applies:

For the syntax and semantics of SphereRegionStruct( ) included in the OmafTimedTextConfigBox, the values of shape_type, dynamic_range_flag, static_azimuth_range, and static_elevation_range are all inferred to be equal to 0.

centre_azimuth and centre_elevation specify the sphere location that is used, together with other information, to determine where the timed text is placed and displayed in 3D space. centre_azimuth shall be in the range of $-180*2^{16}$ to $180*2^{16}-1$, inclusive. centre_elevation shall be in the range of $-90*2^{16}$ to $90*2^{16}$, inclusive.

centre_tilt shall be equal to 0.

region_depth indicates the depth (z-value) of the region on which the timed text is to be rendered. The depth value is the norm of the normal vector of the timed text region. This value is relative to a unit sphere and is in units of $2^{-16}$.

If the relative_to_viewport_flag is equal to 0, the rendering procedure may be as follows:

1. Setup the VR scene geometry by creating the sphere and placing the rendering camera in the centre of the sphere (depending on whether the content is stereo or mono, the rendering camera has to correspondingly be mono or stereo).
2. For each text sample to be rendered at time t, the following applies:
   a. Fetch the corresponding information about depth d, direction (u, v), and the 2D dimensions of the region.
   b. Create a 3D plane with the normal vector calculated out of (d, u, v).
   c. Render the text cue on that plane and on the corresponding 2D rectangle with a centre at the normal vector.

It is asserted that OMAF v1 does not indicate a proper scale for stereoscopic rendering. Players may end up using a different disparity for the timed text region.

The present solution relates to a method for encoding and rendering a presentation, where the presentation comprises visual media content (e.g. video or image) and a visual overlay.

In the method for encoding, the presentation is encapsulated in a container file. Alternatively, or in addition, a media description describing the presentation is authored. The omnidirectional video or image may cover, but does not have to cover, an entire sphere. The visual overlay is one of the following: a monoscopic video, a monoscopic image, graphics or text.

The container file and/or the media description also indicates first relative distance of the omnidirectional video or image. According to an embodiment, the first relative distance is 1, which means that the omnidirectional video or image is projected onto a unit sphere. This case corresponds to the video or image content of OMAF v1.

According to another embodiment, the first relative distance comprises multiple values indicated through a depth map or alike. A depth map is an image with per-pixel depth information. Each sample in a depth map represents the distance of the respective texture sample from the plane or position on which the camera lies. In other words, if the z axis is along the shooting axis of the cameras (and hence orthogonal to the plane on which the cameras lie), a sample in a depth map represents the value on the z axis. Depth maps may use different representations and quantization schemes for depth samples. For example, a finite number of bits, e.g. 8 bits, depth values Z are non-linearly quantized to produce depth map values d as shown below and the dynamical range of represented Z are limited with depth range parameters $Z_{near}/Z_{far}$. Here, z is a particular distance to be represented in a depth map, N is the number of bits to represent the quantization levels for the depth map, and the closest and farthest real-world depth values are $Z_{near}$ and $Z_{far}$, respectively.

$$d = \left\lfloor (2^N - 1) \cdot \frac{\frac{1}{z} - \frac{1}{Z_{far}}}{\frac{1}{Z_{near}} - \frac{1}{Z_{far}}} + 0.5 \right\rfloor$$

The container file and/or the media description also indicates a second relative distance of the visual overlay. According to an embodiment, the second relative distance is the norm of the normal vector of the plane on which the visual overlay is rendered, where the normal vector intersects the origin of the coordinate system and a reference point (such as a center point) of the plane. Such an example corresponds to how timed text regions in OMAF v1 are defined. According to another embodiment, the second relative distance is a vector intersecting the origin of the coordinate system and a reference point (such as a center point) of a plane on which the visual overlay is rendered. This example differs from the previous in that the orientation of the plane is not pre-defined but indicated. More generally, the plane can be replaced by a pre-defined or indicated surface, such as a spherical segment. According to yet another embodiment, the second relative distance may comprise multiple values indicated through a depth map or alike.

The container file and/or the media description also indicates metadata indicative of a scale applicable to convert the first relative distance and the second relative distance to real-world distance units. According to an embodiment, a pre-defined relative unit is indicated in real-world units. For example, the radius of the unit sphere is indicated in real-world units, e.g. in millimeters. According to another embodiment, one pre-defined or indicated real-world unit, such as a millimeter, is indicated in the relative units, such as in units of $2^{-16}$ relative to the unit sphere. According to an embodiment, a proportion between nominal pre-defined or indicated inter-pupillary distance (IPD) and a pre-defined or indicated relative unit, such as the radius of the unit sphere is indicated. For example, it may be indicated what is the inter-pupillary distance (corresponding to e.g. 6.5 cm) given that the omnidirectional video or image is projected on a unit sphere.

According to an embodiment, a nominal screen distance is pre-defined or indicated in relative or real-world units. The relative units may be the same as those used for the first and second distance. The screen distance may be indicated e.g. relative to a viewing position or the origin of the coordinate system.

According to an embodiment, a nominal screen distance is considered to correspond to a zero binocular disparity on stereoscopic rendering. When the first relative distance is greater than, equal to, or less than the nominal relative screen distance, the omnidirectional video/image is intended to be rendered behind the screen level, at the screen level, or in front of the screen level, respectively. Likewise, when the second relative distance is greater than, equal to, or less than the nominal relative screen distance, the visual overlay is intended to be rendered behind the screen level, at the screen level, or in front of the screen level, respectively.

For rendering the presentation, in the method the presentation is at first decapsulated from a container file. Alternatively, or in addition, the presentation may be parsed from the media description describing the presentation. The presentation comprises an omnidirectional video or image, and a visual overlay. A pre-defined first relative distance of the omnidirectional video or image may be used or the first relative distance may be decoded from the container file and/or media description. A second relative distance of the visual overlay is decoded from the container file and/or the media description. Metadata indicate of a scale applicable to convert the first relative distance and the second relative distance to real-world distance units, is decoded from the container file and/or the media description. The scale is then used to derive binocular disparity for the visual overlay.

According to an embodiment, a predefined nominal screen distance is used or a nominal screen distance is decoded in relative or real-world units. The relative units may be the same as those used for the first and second distance.

The container data structure(s) carrying the indications may include but are not limited to one or more of the following:

DASH Media Presentation Description (MPD)
    A descriptor element of a particular indicated type (i.e. a particular @schemeIdUri value).
    One or more attributes that may use an extension namespace.
A container file complying with the ISO base media file format
    A file-level box
    A box contained in the MovieBox
    An entity grouping that groups visual tracks and image items belonging to the same visual presentation. For example, the entity group may comprise an omnidirectional video track or an omnidirectional image, and a visual overlay track or a visual overlay image.
    Sample entry of the visual track (the overlaid visual track)
    Item property of an image item (the overlaid image item)
    Sample entry of the visual track (the overlaying visual track)
    Item property of an image item (the overlaying image item)
    Sample entry of a timed metadata track that specifies the location of the overlying visual track
    TrackGroupTypeBox for a track group that groups visual tracks belonging to the same visual presentation. For example, the track group may comprise an omnidirectional video track and a visual overlay track.
    Sample group, where the default sample group description entry may be used for static info
    Samples of a timed metadata track that specifies the location of the overlaying visual track
    Sample auxiliary information
Metadata embedded in the omnidirectional video or image bitstream or the visual overlay bitstream, such as a supplemental enhancement information (SEI) message, e.g. as or similarly to how SEI messages are specified in HEVC, within the omnidirectional video or image bitstream and/or the visual overlay bitstream The semantics of the layer syntax element of TrackHeaderBox are specified in ISOBMFF as follows: layer specifies the front-to-back ordering of video tracks; tracks with lower numbers are closer to the viewer. 0 is the normal value, and −1 would be in front of track 0, and so on.

According to an embodiment, the layer syntax element of TrackHeaderBox is indicative of a relative distance (e.g. the first relative distance or the second relative distance) for a visual track.

According to an embodiment, a property for an image item is defined in a manner that it is indicative of the layer specifying the front-to-back ordering of image items. This property may be referred to as a composition layer property. When no composition layer property is associated with an image item, a pre-defined layer value, such as 0, may be inferred to apply to the image item.

According to an embodiment, a property for an image item is defined in a manner that it is indicative of a relative distance value of the image item, e.g., the depth (z-value) of the plane on which the image item is to be rendered. The depth value may be defined as the norm of the normal vector of the plane. This value may be indicated relative to the unit sphere and may be indicated as an unsigned integer in where one integer unit corresponds to $2^{-16}$ (relative to the radius of the unit sphere).

According to an embodiment, an entity grouping is defined from grouping visual tracks and image items belonging to the same visual presentation, i.e. grouping visual tracks and image items intended to be composed together. The entity group may bear the semantics the pre-defined or indicated relative distance values for the members of the entity group are intended to be used in rendering. For example, if the layer syntax element value is used for indicating relative distances as explained above, the layer syntax element values associated with the visual tracks and image items of the entity group indicate relative distances on the same scale.

In an embodiment, a relative distance of 1 (e.g. corresponding to the unit sphere) is pre-defined to correspond to the layer syntax element value equal to 0.

In an embodiment, the layer syntax element value equal to 0 is pre-defined to correspond to the screen level. Accordingly, a player may interpret a visual track with the layer syntax element value equal to 0 to be displayed without modifying the binocular disparity; i.e., when the visual track is monoscopic the pictures to be displayed for the left eye and the right eye are identical (with no binocular disparity), and when the visual track is stereoscopic, the pictures output by the decoding/rendering process are displayed without modifying their binocular disparity.

Examples of syntax and semantics that may be used entirely or partly as examples to realize one or more embodiments are described next.

In an embodiment, an entity group is specified as follows:

```
aligned(8) class VisualCompositionGroupBox extends
EntityToGroupBox('vcom', 0, 0) {
unsigned int (32) unit_sphere_distance_in_mm;
}
``` unit_sphere_distance_in_mm specifies a distance, in millimeters, corresponding to the radius of the unit sphere. The value should be used for stereoscopic rendering of the content on the unit sphere together with overlaying content and for deriving suitable binocular disparity for overlaying visual tracks or image items for which the depth is indicated relative to the unit sphere.

In an embodiment, an entity group is specified as follows:

```
aligned(8) class VisualCompositionGroupBox extends
EntityToGroupBox('vcom', 0, 0) {
unsigned int (32) unit_sphere_distance_in_mm;
for (1=0; i<num_entities_in_group; i++) {
   unsigned int(1) entity_specific_depth_flag;
   unsigned int(1) unit_sphere_flag;
   unsigned int(6) reserved;
   if (entity_specific_depth_flag == 0
       && unit_sphere_flag == 0)
      unsigned int(16) entity_depth;
   }
}
``` unit_sphere_distance_in_mm is specified as above. When entity_specific_depth_flag is equal to 1, the depth value for the entity is inferred or indicated by other means. For OMAF timed text tracks, the depth value indicated for the timed text track or samples of the timed text track applies. When unit_sphere_flag is equal to 1, the depth value for the entity is equal to 1 (i.e. the same relative depth as the unit sphere). It is not allowed to have both entity_specific_depth_flag and unit_sphere_flag equal to 1 for the same loop index value i. entity_depth indicates the depth value of the plane on which the entity is to be rendered. The depth value is the norm of the normal vector of the plane. This value is relative to the unit sphere and is in units of $2^{-16}$ (relative to the radius of the unit sphere).

In an embodiment, an entity group is specified as follows:

```
aligned(8) class VisualCompositionGroupBox extends
EntityToGroupBox('vcom', 0, 0) {
unsigned int (32) unit_sphere_distance_in_mm;
for (1=0; i<num_entities_in_group; i++) {
   if (!depthSignalledOtherwise( ))
      unsigned int(16) entity_depth;
   }
}
``` unit_sphere_distance_in_mm is specified as above. depthSignalledOtherwise( ) is a function that may be defined to return 1 when the depth value for the entity is indicated or inferred by other means, such as the depth value indication in the OMAF timed text track, with associated depth map(s), or by inferring that the entity appears on the unit sphere, and to return 0 otherwise. entity_depth is specified as above.

It may be specified that entities are required to be listed in a back-to-front ordering, i.e. in monotonically non-increasing order of depth values inferred or indicated for the entities. When two entities share the same depth value, it may be concluded that the latter entity listed in the VisualCompositionGroupBox is overlaying the former entity.

Alternatively, it may be specified that entities are required to be listed in a front-to-back ordering, i.e. in monotonically non-decreasing order of depth values inferred or indicated for the entities. When two entities share the same depth value, it may be concluded that the former entity listed in the VisualCompositionGroupBox is overlaying the latter entity.

It may be required that entities having the same depth value share the same properties, such as but not limited to one or more of the following:

The same projection format

The same number of views (i.e. all the entities are either monoscopic or stereoscopic, and it is not allowed to have a mixture of monoscopic and stereoscopic entities having the same depth value)

The same extents (i.e., width and height) of the projected picture

With the constraints above, the overlaying of the entities may be performed on the projected picture domain, and the resulting picture containing visual overlays may be rendered using a single rendering mesh.

According to an embodiment, the binocular disparity of a reference point of the visual overlay is indicated in units relative to a sample-grid (e.g. luma sample grid of a picture of a particular resolution) for pre-defined or signaled viewing conditions, including IPD, distance between viewer and display, and picture/grid/display resolution. Several values of the binocular disparity may be indicated, one for each viewing condition.

The embodiments for indicating the scale as discussed above also enable the content author to indicate a suitable binocular disparity for rendering monoscopic video or image on a stereoscopic display. Likewise, the embodiments for decoding the scale as discussed above also enable the player to determine a suitable binocular disparity for rendering monoscopic video or image on a stereoscopic display.

According to an embodiment, the method for content authoring or encapsulation further comprises indicating a third relative distance of cube faces for monoscopic omnidirectional video or image of a cube map projection format, the third relative distance being applicable for directly using the cube maps a rendering mesh, or indicating that the first relative distance is applicable for directly using the cube map as a rendering mesh.

According to an embodiment, the method for rendering further comprises decoding third relative distance of cube faces for monoscopic omnidirectional video or image of a cube map projection format, the third relative distance applicable for directly using the cube map as a rendering mesh, or decoding that the first relative distance is applicable for directly using the cube map as a rendering mesh; and using the cube map as a rendering mesh in rendering.

These embodiments avoid the need to project the decoded cube map content onto a sphere-like rendering mesh (such as that used for equirectangular panorama content) in the player-side rendering. Since the mapping of the decoded video or image to another domain inherently includes resampling (and filtering therein), the embodiments are likely to improve picture quality as such they avoid such resampling. Moreover, the number of triangles in the rendering mesh is significantly smaller in a cube rendering mesh (two triangles per cube face, i.e. 12 triangles in total) compared to a sphere-like rendering mesh (typically consisting thousands of triangles).

According to an embodiment, which may be used together with or independently of other embodiments, a rectilinear visual overlay may be indicated e.g. by an encoder, a file creator, and/or an MPD creator as follows: region-wise packing metadata, such as region-wise packing SEI message, region-wise packing box and/or item property, and/or a region-wise packing descriptor may be created and associated with the rectilinear visual overlay video or image. Omnidirectional projection metadata may be created similarly. The omnidirectional projection metadata may be generated to indicate cubemap projection. The region-wise packing metadata may be generated to indicate that a decoded picture contains region(s) of one cube side only. Consequently, the decoded picture comprises rectilinear content. Projection orientation metadata, such as RotationBox, may be generated to indicate a desired orientation for the visual overlay. Depth metadata may be generated and associated with the visual overlay as described in other embodiments. In an embodiment, the visual overlay may be used without the overlaid omnidirectional video or image, e.g. to insert a period of rectilinear video content in a time-wise interleaved manner adjacent to omnidirectional video content.

According to an embodiment, which may be used together with or independently of other embodiments, an indication of a rectilinear visual overlay may be decoded e.g. by a decoder, a file parser, an MPD parser, and/or a player as follows: region-wise packing metadata, such as region-wise packing SEI message, region-wise packing box and/or item property, and/or a region-wise packing descriptor may be decoded and associated with the rectilinear visual overlay video or image. Omnidirectional projection metadata may be decoded similarly. The decoded omnidirectional projection metadata may indicate cubemap projection. The region-wise packing metadata may indicate that a decoded picture contains region(s) of one cube side only. Consequently, the decoded picture comprises rectilinear content. Projection orientation metadata, such as RotationBox, may be decoded to indicate a desired orientation for the visual overlay. Depth metadata may be decoded and associated with the visual overlay as described in other embodiments. In an embodiment, the visual overlay may be used without the overlaid omnidirectional video or image, e.g. to insert a period of rectilinear video content in a time-wise interleaved manner adjacent to omnidirectional video content.

According to an embodiment, the content authoring may comprise encoding of the omnidirectional video or image and the visual overlay. Similarly, according to an embodiment, the player can comprise decoding of the omnidirectional video or image and the visual overlay.

Figures 7, 8:
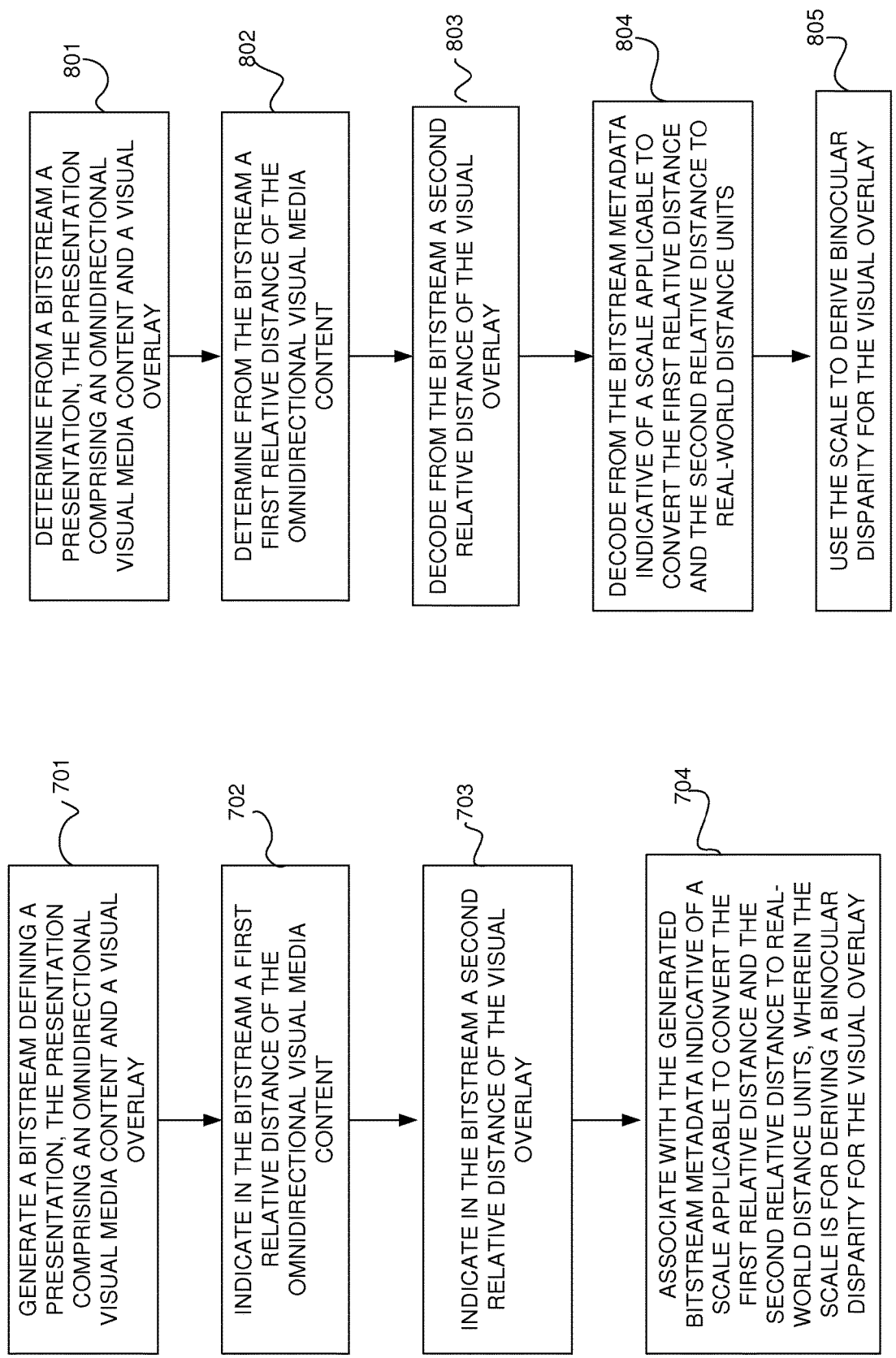
FIG. 7 is a flowchart illustrating a method according to an embodiment.
FIG. 8 is a flowchart illustrating a method according to another embodiment.

FIG. 7 is a flowchart illustrating a method according to an embodiment. A method for encoding comprises generating 701 a bitstream defining a presentation, the presentation comprising an omnidirectional visual media content and a visual overlay; indicating 702 in the bitstream a first relative distance of the omnidirectional visual media content; indicating 703 in the bitstream a second relative distance of the visual overlay; and associating 704 to the generated bitstream metadata indicative of a scale applicable to convert the first relative distance and the second relative distance to real-world distance units, wherein the scale is for deriving a binocular disparity for the visual overlay. It needs to be understood that the bitstream may be encapsulated e.g. as a track and that it may comprise more than one logically separate units, such as several tracks. It also needs to be understood that alternatively or additionally to indicating in the bitstream (702 and/or 703), the indicating may be performed along the bitstream, e.g. in a media description.

An apparatus according to an embodiment comprises means for generating a bitstream defining a presentation, the presentation comprising an omnidirectional visual media content and a visual overlay; means for indicating in the bitstream a first relative distance of the omnidirectional visual media content; means for indicating in the bitstream a second relative distance of the visual overlay; and means for associating with the generated bitstream metadata indicative of a scale applicable to convert the first relative distance and the second relative distance to real-world distance units, wherein the scale is for deriving a binocular disparity for the visual overlay.

The means comprises a processor, a memory, and a computer program code residing in the memory, wherein the processor may further comprise a processor circuitry.

FIG. 8 is a flowchart illustrating a method according to an embodiment. A method for rendering comprises determining 801 from a bitstream a presentation, the presentation comprising an omnidirectional visual media content and a visual overlay; determining 802 from the bitstream a first relative distance of the omnidirectional visual media content; decoding 803 from the bitstream a second relative distance of the visual overlay; decoding 804 from the bitstream metadata indicative of a scale applicable to convert the first relative distance and the second relative distance to real-world distance units; and using 805 the scale to derive binocular disparity for the visual overlay. It needs to be understood that the bitstream may have been encapsulated e.g. as a track and that it may comprise more than one logically separate units, such as several tracks. It also needs to be understood that alternatively or additionally to decoding in the bitstream (802, 803, and/or 804), the decoding may be performed from a structure associated with the bitstream, e.g. from a media description.

An apparatus according to an embodiment comprises means for determining from a bitstream a presentation, the presentation comprising an omnidirectional visual media content and a visual overlay; means for determining from the bitstream a first relative distance of the omnidirectional visual media content; means for decoding from the bitstream a second relative distance of the visual overlay; means for decoding from the bitstream metadata indicative of a scale applicable to convert the first relative distance and the second relative distance to real-world distance units; and means for using the scale to derive binocular disparity for the visual overlay. The means comprises a processor, a memory, and a computer program code residing in the memory, wherein the processor may further comprise a processor circuitry.

Figure 9:
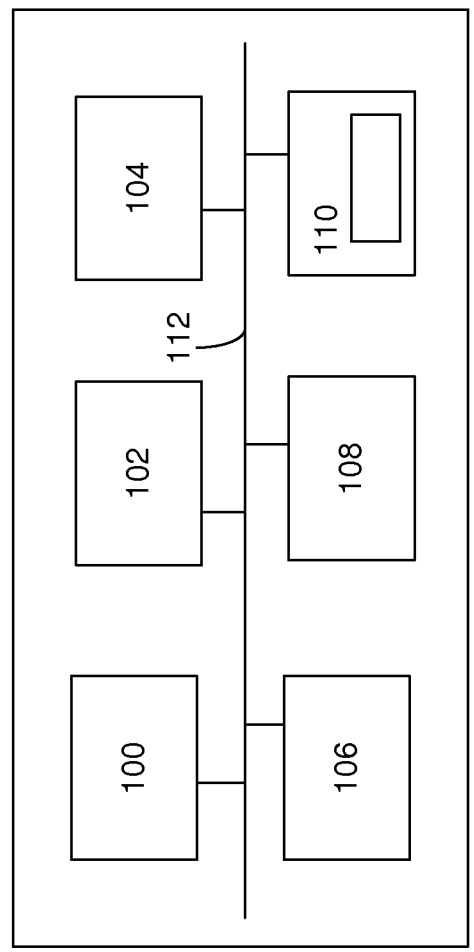
FIG. 9 shows an apparatus according to an embodiment.

An example of a data processing system for an apparatus is illustrated in FIG. 9. Several functionalities can be carried out with a single physical device, e.g. all calculation procedures can be performed in a single processor if desired. The data processing system comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100.

Computer program code resides in the memory 102 for implementing, for example the method according to flowcharts of FIG. 7 or 8. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

In the above, some embodiments have been described in relation to DASH or MPEG-DASH. It needs to be understood that embodiments could be similarly realized with any other similar streaming system, and/or any similar protocols as those used in DASH, and/or any similar segment and/or manifest formats as those used in DASH, and/or any similar client operation as that of a DASH client. For example, Some embodiments could be realized with the M3U manifest format. Moreover, embodiments are not limited to media descriptions for streaming but also apply for other types of media applications, such as conferencing. For example, embodiments may be realized using the IETF SDP protocol as a media description.

In the above, some embodiments have been described in relation to ISOBMFF. It needs to be understood that embodiments could be similarly realized with any other file format, such as Matroska.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method comprising:
generating a bitstream defining a presentation, the presentation comprising an omnidirectional visual media content and a visual overlay comprising monoscopic content;
indicating in the bitstream a first relative distance of the omnidirectional visual media content;
indicating in the bitstream a second relative distance of the visual overlay;
associating, with the generated bitstream, metadata indicative of a scale applicable to convert the first relative distance and the second relative distance to real-world distance units, wherein the scale is for deriving a binocular disparity for the visual overlay to enable the visual overlay to be displayed stereoscopically in the presentation; and
outputting the bitstream comprising the first and second relative distances and the metadata.

2. The method according to claim 1, wherein the bitstream comprises a container file comprising an encapsulated presentation.

3. The method according to claim 1, wherein the bitstream comprises a media description describing the presentation.

4. The method according to claim 1, wherein the omnidirectional visual media content comprises omnidirectional video or omnidirectional image.

5. The method according to claim 1, wherein the monoscopic content comprises one of the following: a monoscopic video, a monoscopic image, graphics, or text.

6. The method according to claim 1, wherein the first relative distance comprises '1' or multiple values indicated through a depth map.

7. The method according to claim 1, wherein the second relative distance comprises one of the following: a norm of a normal vector of a plane on which the visual overlay is rendered; a vector intersecting an origin of a coordinate system and a reference point of a plane on which the visual overlay is rendered; or multiple values indicated through a depth map.

8. The method according to claim 1, further comprising:
indicating a third relative distance of cube faces for monoscopic omnidirectional visual media content of a cube map projection format, the third relative distance being applicable for directly using the cube map as a rendering mesh, or indicating that the first relative distance is applicable for directly using the cube map as a rendering mesh.

9. An apparatus comprising:

at least one processor; and at least one memory including computer program code; the at least one memory and the computer program code configured to, with the at least one processor, cause the apparatus at least to perform:

generate a bitstream defining a presentation, the presentation comprising an omnidirectional visual media content and a visual overlay comprising monoscopic content;

indicate in the bitstream a first relative distance of the omnidirectional visual media content;

indicate in the bitstream a second relative distance of the visual overlay;

associate, with the generated bitstream, metadata indicative of a scale applicable to convert the first relative distance and the second relative distance to real-world distance units, wherein the scale is for deriving a binocular disparity for the visual overlay to enable the visual overlay to be displayed stereoscopically in the presentation; and outputting the bitstream comprising the first and second relative distances and the metadata.

10. The apparatus according to claim 9, wherein the bitstream comprises a container file comprising an encapsulated presentation.

11. The apparatus according to claim 9, wherein the bitstream comprises a media description describing the presentation.

12. The apparatus according to claim 9, wherein the omnidirectional visual media content comprises omnidirectional video or omnidirectional image.

13. The apparatus according to claim 9, wherein the monoscopic content comprises one of the following: a monoscopic video, a monoscopic image, graphics, or text.

14. The apparatus according to claim 9, wherein the first relative distance comprises '1' or multiple values indicated through a depth map.

15. The apparatus according to claim 9, wherein the second relative distance comprises one of the following: a norm of a normal vector of a plane on which the visual overlay is rendered; a vector intersecting an origin of a coordinate system and a reference point of a plane on which the visual overlay is rendered; or multiple values indicated through a depth map.

16. The apparatus according to claim 9, wherein the apparatus is further configured to indicate a third relative distance of cube faces for monoscopic omnidirectional visual media content of a cube map projection format, the third relative distance being applicable for directly using the cube map as a rendering mesh, or indicating that the first relative distance is applicable for directly using the cube map as a rendering mesh.

17. A method comprising:

receiving a bitstream;

determining from the bitstream a presentation, the presentation comprising an omnidirectional visual media content and a visual overlay comprising monoscopic content;

determining from the bitstream a first relative distance of the omnidirectional visual media content;

decoding from the bitstream a second relative distance of the visual overlay;

decoding from the bitstream metadata indicative of a scale applicable to convert the first relative distance and the second relative distance to real-world distance units;

using the scale to derive binocular disparity for the visual overlay to enable the visual overlay to be displayed stereoscopically in the presentation; and outputting information to enable the presentation to be displayed.

18. An apparatus comprising:

at least one processor, and memory including computer program code, the memory and the computer program code configured to, with the at least one processor, cause the apparatus to perform at least the following:

receiving a bitstream;

determine from the bitstream a presentation, the presentation comprising an omnidirectional visual media content and a visual overlay comprising monoscopic content;

determine from the bitstream a first relative distance of the omnidirectional visual media content;

decode from the bitstream a second relative distance of the visual overlay;

decode from the bitstream metadata indicative of a scale applicable to convert the first relative distance and the second relative distance to real-world distance units;

use the scale to derive binocular disparity for the visual overlay to enable the visual overlay to be displayed stereoscopically in the presentation; and outputting information to enable the presentation to be displayed.

19. An apparatus according to claim 18, further comprising computer program code configured to cause the apparatus to:

decode a third relative distance of cube faces for monoscopic omnidirectional visual media content of a cube map projection format, the third relative distance being applicable for directly using the cube map as a rendering mesh, or decode the first relative distance is applicable for directly using the cube map as a rendering mesh; and use the cube map as a rendering mesh in rendering.

20. A computer program product embodied on a non-transitory computer readable medium, comprising computer program code configured to, when executed on at least one processor, cause an apparatus or a system to:

generate a bitstream defining a presentation, the presentation comprising an omnidirectional visual media content and a visual overlay comprising monoscopic content;

indicate in the bitstream a first relative distance of the omnidirectional visual media content;

indicate in the bitstream a second relative distance of the visual overlay;

associate, with the generated bitstream, metadata indicative of a scale applicable to convert the first relative distance and the second relative distance to real-world distance units, wherein the scale is for deriving a binocular disparity for the visual overlay to enable the visual overlay to be displayed stereoscopically in the presentation; and outputting the bitstream comprising the first and second relative distances and the metadata.

* * * * *